(No Model.)

F. C. STANIFORD.
FRUIT PITTING MACHINE.

No. 475,048. Patented May 17, 1892.

Witnesses,
G. H. Mouse
J. A. Bayless

Inventor,
Frank C. Staniford
By Dewey & Co.
Att'ys

UNITED STATES PATENT OFFICE.

FRANK C. STANIFORD, OF GILROY, ASSIGNOR OF ONE-HALF TO DE WITT C. RIDDELL, OF SANTA CRUZ, CALIFORNIA.

FRUIT-PITTING MACHINE.

SPECIFICATION forming part of Letters Patent No. 475,048, dated May 17, 1892.

Application filed August 1, 1891. Serial No. 401,416. (No model.)

*To all whom it may concern:*

Be it known that I, FRANK C. STANIFORD, a citizen of the United States, residing at Gilroy, Santa Clara county, State of California, have invented an Improvement in Fruit-Pitting Machines; and I hereby declare the following to be a full, clear, and exact description of the same.

My invention relates to an improved device for removing the pits from peaches, apricots, and similar fruit.

It consists of a table with guides and overlapping knives, a mechanism by which said knives are caused to reciprocate to and from each other, and a fruit-supporting table situated beneath and between the meeting ends of the knives, said table being depressible to bring the fruit into line with the knives and automatically returned by a spring when released.

It also consists in certain details of construction, which will be more fully explained by reference to the accompanying drawings, in which—

Figure 1:
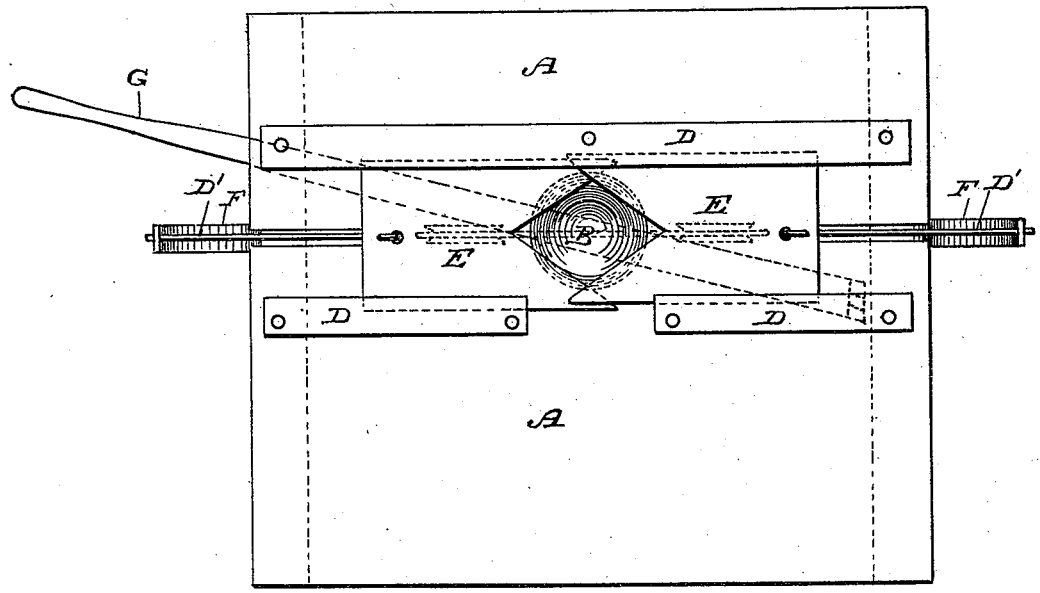
Figure 2:
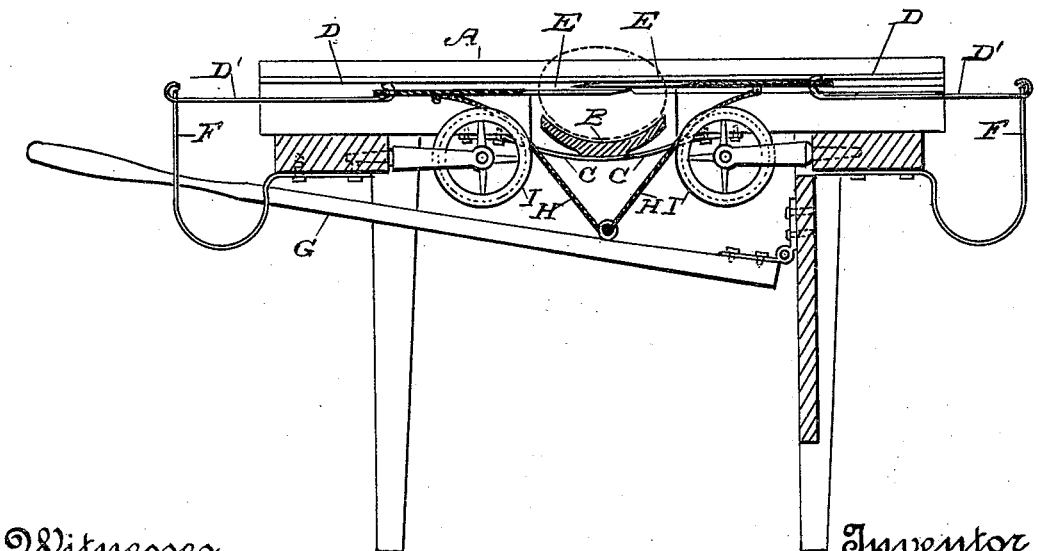

Figure 1 is a plan view of my apparatus. Fig. 2 is a sectional view showing the arrangement of the knives and the fruit-carrying support depressed.

A is a table or bench of any convenient size. It may be supported in an approximately horizontal or other suitable position; but I prefer to place it at an inclination, as shown, so that the fruit will be discharged from it automatically when released and will fall over the lower edge into the proper receptacle. Through this table is made a hole, in which is fitted a cup-shaped support B of sufficient size to receive the fruit. This cup is supported upon a spring-plate or other yielding support C beneath the table, so that the upper surface of the cup is approximately flush with the upper surface of the table. Upon the upper surface of the table are the guides D, and between these guides the knives or cutters E are adapted to reciprocate. The adjacent ends of the knives have V-shaped notches, which are sharpened to cutting-edges, and these knives overlap, so as to slide past each other and above the cup-shaped fruit-receptacle. If desired, the table may be slotted and lugs project from the lower sides of the knife to assist in more perfectly guiding them in their reciprocation; but I have found that the exterior guides are sufficient for ordinary purposes. To the ends of the knives are connected the inner ends of the rods D', and the outer ends of these rods are connected with the elastic arms F, which are secured at some convenient point to the table.

G is a lever having one end fulcrumed beneath the table and the other extending out to a point beyond the end of the table within convenient reach of the operator.

Flexible cords or straps H are connected with points of attachment which project from the lower sides of the knife-blades, and these cords pass over pulleys I upon each side of opening which contains the cup-shaped fruit-receptacle. From these pulleys the cords lead downward and are suitably connected with the lever.

The operation will then be as follows: The fruit is taken in the fingers and placed upon the cup-shaped receptacle with its major axis in the plane between the V-shaped cutting-edges of the knives, and the receptacle is slightly depressed against the resistance of its supporting-spring. With the other hand the operator presses the lever down and this, acting through the cords, draws the knives toward each other, so that they split the fruit lengthwise and loosen it from the pit or stone. The parts being released, the knives are immediately withdrawn by the action of the spring-arms to which they are attached, the lever rising to its normal position, and the spring-actuated fruit-receptacle rises to its original position and throws the fruit out, so that the latter rolls off the table into the receptacle prepared for it.

In order to insure the knives passing each other perfectly, one of them travels over a plate of metal secured to the table, this plate being of thickness equal to the other knife, or that portion of the table may be raised to a similar amount for the same purpose.

It is well known that in order to make a merchantable article all such fruits as peaches, apricots, &c., must be split in the direction of the major axis and longer diameter of the fruit and the stone, and no automatic means have been devised by which the fruit can be accurately placed in this position without other assistance. By my device the operator can rapidly place each fruit between the knives, and a basket of fruit can be thus pitted in five or six minutes and all the fruit turned out in good merchantable condition.

Having thus described my invention, what I claim as new, and desire to secure by Letters Patent, is—

1. A fruit-pitting machine comprising a table having a central opening, a cup-shaped receptacle within said opening, a yielding support therefor, knives or cutters movable in guides upon the table and having V-shaped edges overlapping each other, and means for reciprocating the knives, substantially as herein described.

2. In a fruit-pitting machine, the table having a central opening, a cup-shaped receptacle for fruit within said opening and movable vertically therein, springs by which it is elevated after having been depressed by pressure, reciprocating knives moving in guides upon the surface of the table, so that their meeting and cutting edges pass each other above the fruit-receptacle, flexible cords or straps connected with the cutters, guide-pulleys over which they pass toward the center, a lever fulcrumed beneath the table, to which said cords are connected and by which the knives are moved toward each other above the fruit-receptacle, and springs and connecting-rods by which the knives are separated and the parts returned to their normal position when the lever is released, substantially as herein described.

In witness whereof I have hereunto set my hand.

FRANK C. STANIFORD.

Witnesses:
S. H. NOURSE,
J. A. BAYLESS.